United States Patent [19]
Iijima

[11] Patent Number: 5,972,083
[45] Date of Patent: Oct. 26, 1999

[54] INK COMPOSITION WRITING INSTRUMENT CONTAINING SAME METHOD OF FORMING PATTERN ON RECEIVING SURFACE OF OBJECT AND PATTERN FORMING KIT

[75] Inventor: Zenshiro Iijima, Abiko, Japan

[73] Assignee: Adger Kogyo Co., Ltd., Japan

[21] Appl. No.: 09/164,337

[22] Filed: Oct. 1, 1998

[51] Int. Cl.$^6$ .................................................. C09D 11/00
[52] U.S. Cl. ..................................... 106/31.32; 106/31.64
[58] Field of Search .............................. 106/31.32, 31.64

[56] References Cited

U.S. PATENT DOCUMENTS

| | | | |
|---|---|---|---|
| 4,030,934 | 6/1977 | Iijima | 106/31.32 |
| 4,211,528 | 7/1980 | Cuvelier | 106/31.43 |
| 5,082,495 | 1/1992 | Iijima | 106/31.16 |

*Primary Examiner*—Mark L. Bell
*Assistant Examiner*—Veronica F. Faison
*Attorney, Agent, or Firm*—Lorusso & Loud

[57] ABSTRACT

A method of making a design on a receiving surface of an object, including overlaying a surface bearing an original pattern with a transparent or translucent thin sheet capable of permeating an ink, and tracing the original pattern on the sheet with an ink containing an organic solvent in which a first, white coloring agent selected from salicylic acid and acetylsalicylic acid and a second coloring agent giving a color other than white are dissolved, thereby to form a copy pattern on the surface of the sheet. The copy pattern-bearing sheet is overlaid with the receiving surface and the assembly is heated while maintaining the receiving surface in pressure contact with the sheet, whereby the ink of the copy pattern penetrates through the sheet onto the receiving surface to form thereon the design having a white color attributed to the first coloring agent or a color attributed to the second coloring agent, depending upon the heating time.

5 Claims, No Drawings

INK COMPOSITION WRITING INSTRUMENT CONTAINING SAME METHOD OF FORMING PATTERN ON RECEIVING SURFACE OF OBJECT AND PATTERN FORMING KIT

BACKGROUND OF THE INVENTION

1. Field of the Invention

This invention relates generally to an ink composition for forming a design on an object and, more specifically to an ink useful for forming a design on textiles, leathers, papers, plastics or metals in handicraft, tailor or embroidery fields. The present invention is also directed to a writing instrument containing the above ink composition, to a method of forming a pattern on a receiving surface of an object and to a pattern forming kit.

2. Description of Prior Art

U.S. Pat. No. 5,226,990 assigned to Adger Kogyo Co., Ltd. discloses a method for making a rough design on a receiving surface of an object. In this method, after a surface bearing an original pattern has been overlaid with an ink-permeable tissue paper, the original pattern is traced on the tissue paper with a first writing element to form a copy pattern corresponding to the original pattern on the surface of the tissue paper. Then, after the receiving surface has been overlaid with the tissue paper having the copy pattern, the copy pattern is traced with a second writing element containing an erasable ink, whereby the ink of the element penetrates through the tissue paper onto the receiving surface to form the rough design thereon.

With the above method, two, first and second writing elements are required for making a rough design on a receiving surface. Further, it is necessary to use two or more kinds of the second writing elements having different colors, e.g. black and white, when the receiving surface has different colors, e.g. white and black.

U.S. Pat. No. 5,082,495 assigned to Adger Kogyo Co., Ltd. discloses a substantially colorless, transparent ink composition containing (a) an organic solvent, (b) salicylic acid or acetylsalicylic acid dissolved in the organic solvent, and (c) a polymer dissolved in the organic solvent. The ink composition turns white upon use. The white pattern is erasable by wiping with a water-impregnated wet cloth or by ironing. With this ink composition, it takes a few seconds before the written image becomes visible.

SUMMARY OF THE INVENTION

In accordance with one aspect of the present invention, there is provided an ink composition containing an organic solvent, a first, white coloring agent dissolved in the organic solvent and selected from the group consisting of salicylic acid and acetylsalicylic acid, and a second coloring agent dissolved in the organic solvent and giving a color other than white.

In another aspect, the present invention provides a writing instrument having an ink container containing the above ink composition.

In a further aspect, the present invention provides an image forming kit including a transparent or translucent thin sheet capable of permeating an ink, and the above writing instrument.

The present invention also provides a method of making a design on a receiving surface of an object, which includes the steps of:

(a) overlaying a surface bearing an original pattern with a transparent or translucent thin sheet capable of permeating an ink;

(b) tracing the original pattern on the sheet with a writing instrument containing the above ink composition to form a copy pattern corresponding to the original pattern on the surface of the sheet;

(c) overlaying the receiving surface with the sheet having the copy pattern, and (d) heating the receiving surface overlaid with the sheet while maintaining the receiving surface in pressure contact with the sheet, whereby the ink of the copy pattern penetrates through the sheet onto the receiving surface to form the design thereon.

The present invention further provides a method of making a design on a receiving surface of an object, which includes the steps of:

(a) overlaying the receiving surface with a transparent or translucent thin sheet capable of permeating an ink and having a pattern of the above ink composition; and (b) heating the receiving surface overlaid with the sheet while maintaining the receiving surface in pressure contact with the sheet, whereby the ink of the pattern penetrates through the sheet onto the receiving surface to form the design thereon.

It is the primary object of the present invention to provide an ink composition which immediately gives a visible image on a receiving surface of any color.

It is a special object of the present invention to provide an erasable ink composition.

It is a further object of the present invention to provide a simple method for forming a copy design on a desired surface.

Other objects, features and advantages of the present invention will become apparent from the detailed description of the preferred embodiments of the invention to follow.

DETAILED DESCRIPTION OF THE PREFERRED EMBODIMENTS OF THE INVENTION

The ink composition according to the present invention can form a clear pattern on a receiving surface of an any desired object such as a textile, a leather, a paper, a plastic or a metal. The receiving surface may have any color inclusive of white and black.

The ink composition contains an organic solvent such as an alcohol, an ether, a ketone, an ester or a halogenated hydrocarbon, preferably having a boiling point of 150° C. or less, more preferably 100° C. or less. Illustrative of suitable solvents are ethanol, methanol, isopropanol, isobutanol, secondary amyl alcohol, tertiary amyl alcohol, acetone, methyl ethyl ketone, chloroform, acetonitrile, ethylene chloride and trichloroethylene.

Dissolved in the organic solvent is a first coloring agent selected from salicylic acid, acetylsalicylic acid and a mixture thereof and a second coloring agent giving a color pattern other than white.

The first coloring agent gives a white pattern. Because of its solubility in water and of its sublimability, the white pattern of the first coloring agent is erasable when wiped with a wet cloth or when heated for a suitable period of time. Further, because of its acidity, the first coloring agent can interact with the second coloring agent as described hereinafter.

Any coloring agent can be used as the second coloring agent as long as it can give, by itself or in combination with the first coloring agent, a legible pattern of, preferably, red, blue, green or black, on a white or light-colored receiving surface. Depending upon the intended use, the second coloring agent is desirably erasable when the pattern thereof is treated with any suitably means such as heat, water or an organic solvent or when the pattern is allowed to stand for a certain period of time (e.g. 1 hours or more). As the second coloring agent, a less sublimable substance as compared with the first coloring agent is generally used.

The second coloring agent may be of an independent type whose color is not influenced by the presence of the first coloring agent, or of a dependent type whose color is influenced by the first coloring agent.

Examples of the second coloring agents of the former, independent type include various types of solvent-soluble dyes such as Basic Red 12, Solvent Red 8, Basic Brown 1, Basic Green 4 and Basic Blue 28. Cobaltous thiocyanate and ferric thiocyanate which are erasable with water are preferred examples of the independent type second coloring agent.

Examples of the second coloring agents of the latter, dependent type include various indicators capable of changing colors by contact with an acid (i.e., first coloring agent) and dyes capable of developing colors by contact with the first coloring agent. Methyl Red, Dimethyl Yellow, Bromcresol Green, Heptamethoxy Red, Bromchlorophenol Blue, Methyl Violet and Naphthyl Red are examples of such indicators.

Typical example of the acid-developed dye is 3,3-bis(p-dimethylaminophenyl)-6-dimethylaminophthalide (Crystal Violet Lactone), Rhodamine B Lactone and 4,4',4"-methylidynetris-(N,N-dimethyl-benzeneamine).

The first coloring agent is present in an amount of 5% by weight or more, preferably 10% by weight or more, based on the organic solvent but below the saturated concentration, preferably not more than 90% of the saturated concentration. The second coloring agent is present in an amount of 0.01–10% by weight, preferably 0.05–5% by weight, based on the organic solvent.

It is preferred that the ink composition contain a polymer soluble in the organic solvent for reasons of prevention thereof from being quickly absorbed in an ink permeable thin sheet on which an original pattern is copied therewith. Illustrative of suitable polymers are polyethylene oxide, polyvinylpyrrolidone, polyvinylbutyral, polyacrylate, polyvinyl acetate, phenol resin, shellac, rosin, dammar and copal. Especially preferred polymer is polyethylene oxide having a number average molecular weight of about $10^5$ to $10^7$. The amount of the polymer is generally 0.001–15 parts by weight per 100 parts by weight of the total weight of the organic solvent and the first and second coloring agents.

The ink composition is suitably used for forming a copy design on a receiving surface of an object using an original design. In this design forming method, a transparent or translucent thin sheet capable of permeating the ink is used. Such a sheet may be, for example, a thin paper, a thin tissue paper, a thin textile fabric or a thin non-woven fabric.

The thin sheet is superposed on the original pattern bearing surface and the original pattern is traced on the sheet with a writing instrument containing the above ink composition to form a copy pattern corresponding to the original pattern on the surface of the sheet. Any writing instrument may be used for tracing the original pattern. For example, a felt tip pen having an ink container containing the ink composition may be suitably used.

Then, the receiving surface is overlaid with the sheet having the copy pattern. The sheet is heated while maintaining the receiving surface in pressure contact with the sheet so that the ink of the copy pattern penetrates through the sheet onto the receiving surface to form the design thereon. The heating may be carried out, for example, by ironing or by contact with a heater roller. Commercially available electric ironing devices may be suitably used.

Depending upon the color of the receiving surface, the heating is performed in different manners as follows.

When the receiving surface has a dark color, a white pattern attributed to the first coloring agent is to be formed. Thus, the heating is carried out for a short period of time sufficient for the first coloring agent constituting the copy pattern on the thin sheet can penetrate through the thin sheet onto the receiving surface but insufficient for the second coloring agent to penetrate therethrough, so that the pattern formed on the receiving surface is white and is able to be clearly seen. The white pattern on the receiving surface may be erased by, for example, wiping with a wet cloth, heating the surface or being allowed to stand for a required period of time.

When the receiving surface has a light or white color, a dark color pattern attributed to the second coloring agent or the first and second coloring agents is to be formed. Thus, the heating is carried out for a period of time sufficient for the first and second coloring agents constituting the copy pattern on the thin sheet can penetrate through the thin sheet onto the receiving surface.

In this case, when the second coloring agent is of a dependent type, such as Methyl Red or crystal violet lactone, which requires the first coloring agent for forming a dark color, the heating is carried out for a limited period of time so that at least a part of the first coloring agent transferred to the receiving surface remains thereon. The color pattern thus formed on the receiving surface may be erased by, for example, wiping with a wet cloth, heating the surface or being allowed to stand for a required period of time.

When the second coloring agent is of an independent type, the heating may be carried out for a relatively long period of time so that the first coloring agent once transferred to the receiving surface completely disappear by sublimation. When the second coloring agent is erasable, such as in the case of cobaltous thiocyanate, the pattern thus formed on the receiving surface may be erased by, for example, wiping with a wet cloth.

The period of time for which the above heating step is carried out varies with the heating temperature, the amount of the first coloring agent, the kind and amount of the second coloring agent, the heating time, the kind of the receiving surface, etc. and easily suitably determined by simple experiments. Generally, the heating step is carried out for 1–5 seconds at 80–120° C. for obtaining a white color pattern and for 2–30 seconds at 100–180° C. for obtaining a pattern having a color other than white.

The ink composition according to the present invention may be used for producing a printed sheet which comprises a transparent or translucent thin sheet capable of permeating the ink composition, and a design made of the ink composition and formed on the thin sheet. By heating a receiving surface of an object overlaid with the printed sheet while maintaining the receiving surface in pressure contact with the printed sheet, the ink of the design penetrates through the sheet onto the receiving surface to form the design thereon.

The following examples will further illustrate the present invention.

EXAMPLE 1

Salicylic acid (30 g) was dissolved in a mixed solvent consisting of 80 ml of isopropanol and 20 ml of ethylene chloride to obtain a solution, in which 0.8 g of polyethylene oxide (molecular weight: $6 \times 10^5$ to $11 \times 10^5$) and 0.1 g of Methyl Red were successively dissolved, thereby obtaining an orange red ink. The ink was charged in an ink tank of a felt tip pen.

A translucent tissue paper was superimposed on a surface having an original design. The design was then traced with the above tip pen to form an orange red pattern on the tissue paper. A black textile was overlaid with the pattern-bearing tissue paper. The tissue paper was then heated with an iron at about 100° C. for about 1 second. As a result, a white design was formed on the black textile. The white design was erased by ironing.

Similarly, a white textile was overlaid with the pattern-bearing tissue paper. The tissue paper was then heated with an iron at 130° C. for about 5 seconds. As a result, a red design was formed on the white textile. The red design was turn light yellow when wiped with a wet cloth.

EXAMPLE 2

Acetylsalicylic acid (20 g) was dissolved in a mixed solvent consisting of 70 ml of isopropanol and 30 ml of ethylene chloride to obtain a solution, in which 0.8 g of polyethylene oxide (molecular weight: $6 \times 10^5$ to $11 \times 10^5$) and 0.2 g of crystal violet lactone were successively dissolved, thereby obtaining a blue ink. The ink was charged in an ink tank of a felt tip pen.

A translucent tissue paper was superimposed on a surface having an original design. The design was then traced with the above tip pen to form a blue pattern on the tissue paper. A black textile was overlaid with the pattern-bearing tissue paper. The tissue paper was then heated with an iron at about 100° C. for about 1 second. As a result, a white design was formed on the black textile. The white design disappeared when allowed to stand for 10 days.

Similarly, a white textile was overlaid with the blue pattern-bearing tissue paper. The tissue paper was then heated with an iron at about 130° C. for about 6 seconds. As a result, a blue design was formed on the white textile. The blue design disappeared when allowed to stand for 10 days.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. An ink composition comprising an organic solvent, a first, white coloring agent dissolved in the organic solvent and selected from the group consisting of salicylic acid and acetylsalicylic acid, and a second coloring agent dissolved in said organic solvent and giving a color other than white.

2. An ink composition as claimed in claim 1, wherein said second coloring agent gives an erasable pattern.

3. An ink composition as claimed in claim 1, wherein said second coloring agent is selected from the group consisting of methyl red, 3,3-bis(p-dimethylaminophenyl)-6-dimethylaminophthalide and cobaltous thiocyanate.

4. An ink composition as claimed in claim 1, further comprising a polymer dissolved in said organic solvent.

5. A writing instrument comprising an ink container containing an ink composition according to claim 1.

* * * * *